United States Patent [19]
Buchanan et al.

[11] Patent Number: 5,001,653

[45] Date of Patent: Mar. 19, 1991

[54] MERGING PLOTTER GRAPHICS WITHIN A TEXT ENVIRONMENT ON A PAGE PRINTER

[75] Inventors: James C. Buchanan; Joseph P. Kolb; Lynn M. Oliver; James F. Webb, all of Lexington, Ky.

[73] Assignee: International Business Machines Corporation, Armonk, N.Y.

[21] Appl. No.: 405,603

[22] Filed: Sep. 8, 1989

[51] Int. Cl.⁵ .............................................. G06F 3/12
[52] U.S. Cl. .................................. 364/523; 364/519; 364/520
[58] Field of Search .................. 340/747; 364/518–523

[56] References Cited

U.S. PATENT DOCUMENTS

| | | | |
|---|---|---|---|
| 4,700,182 | 10/1987 | Ohgami | 340/747 X |
| 4,918,624 | 4/1990 | Moore et al. | 364/519 |
| 4,928,243 | 5/1990 | Hodges et al. | 364/519 |
| 4,941,108 | 7/1990 | Aoyagi et al. | 364/519 |

Primary Examiner—David L. Clark
Attorney, Agent, or Firm—John J. McArdle, Jr.

[57] ABSTRACT

A printer receives and stores coded text character data (22, 23) and also receives graphic image commands in the same datastream. The printer creates a raster image (24) of the graphic image commands and stores the resultant raster image. When rasterizing a page (21), the printer rasterizes the text character data utilizing stored raster fonts and rasterizes the graphic image data from the stored raster image.

10 Claims, 12 Drawing Sheets

FIG. 6

```
7 6 5 4 3 2 1 0
X X              WINDOW UNITS IDENTIFIER
0 0 . . . . . . . . . . . . . . NOT USED
0 1 . . . . . . . . . . . . . . PLOTTER UNITS (1/1016 in.) (DEFAULT)
1 0 . . . . . . . . . . . . . . 1/1440 in.
1 1 . . . . . . . . . . . . . . 1/1200 in.

X           AUTO – SCALING ON OR OFF (DEFAULT ON)
     0 . . . . . . . . . . . . OFF
     1 . . . . . . . . . . . . ON

X          COLOR SIMULATION ON OR OFF (DEFAULT OFF)
      0 . . . . . . . . . . . OFF
      1 . . . . . . . . . . . ON

X         ENHANCED MODE ON OR OFF (DEFAULT OFF)
       0 . . . . . . . . . . OFF
       1 . . . . . . . . . . ON

X        FORCE LOW RESOLUTION (vs. AUTOMATIC)
        0 . . . . . . . . . AUTO SELECTION (DEFAULT)
        1 . . . . . . . . . FORCE LOW

X       SET ASCII CURSOR = LAST PEN POSITION
         0 . . . . . . . . RETAIN ASCII CURSOR POSITION (DEFAULT)
         1 . . . . . . . . SET ASCII CURSOR POSITION TO LAST PEN POSITION 0 0 0 0 0 0 0 1  RESET ALL VALUES TO POR DEFAULTS
0 0 0 0 0 0 0 0  USE PREVIOUS VALUES
```

FONT DEFINITION TABLE

PLOTTER IMAGE CACHE TABLE

MERGING PLOTTER GRAPHICS WITHIN A TEXT ENVIRONMENT ON A PAGE PRINTER

Field of the Invention

This invention relates generally to page printers and more particularly concerns the merging of graphics related commands within a text environment on a page printer.

BACKGROUND OF THE INVENTION

Printers receive input data from a source such as a host computer and produce printed output based upon the received data. In a page printer, for example, received data is stored and used to produce a data bit representation of a page to be printed (during rasterization), and the bit data image of the page is then moved to a print mechanism for physical printing (during serialization). In an electrophotographic laser page printer, the serialized bit data modulates a laser beam swept across a photoconductor.

In the case of input text data, rasterization usually involves copying bit images of characters from character fonts into a bit map memory to produce the bit data representation of the desired page. Coded representations of the characters to be rasterized, together with coded representations of commands for positioning the characters on a page to be printed, are held in a page buffer which is formatted in some fashion to facilitate rasterization.

In a page printer lacking sufficient memory for storing a bit map of an entire page to be printed, a swathing architecture is employed. In a swathing architecture, a page in the page buffer to be printed is rasterized into a series of contiguous raster line blocks referred to as swaths. Rasterization is accomplished iteratively, rasterizing a portion of the page into each swath as the swath is made available, until the entire page has been completed.

Graphic and other image data to be printed is generally sent from a host to a printer in a form other than that of coded text characters. Some image data is provided from the host in raster format, which may be received and stored by the printer for subsequent rasterization into bit map memory or placed directly into bit map memory. Graphic image data may also be represented by commands, such as for drawing lines and shapes. Command structures exist, for example, for providing plotter commands to a pen plotter. Page printers are available which have the capability of operating in a mode in which the printer can interpret pen plotter commands to rasterize and print the graphic image represented by the commands.

When a page printer operates in a mode to interpret and rasterize plotter commands, the variety and quality of fonts used for text printing are unavailable to the printer. Changing modes of printer operation, from plotter mode to text mode for example, typically results in the printing of a page before the mode change so that mixing plotter graphics with text on a page is impossible using a printer mode change. In order to combine plotter graphics on the same page as text, it is necessary for the application software run by the host computer to convert plotter graphics commands to either a text character approximation or raster image data before sending the data to the printer. The text character approximations are not particularly accurate, and sending raster image data to the printer requires host processing resources to convert the plotter graphics commands. Producing raster images of plotter graphics commands at the host also greatly increases host memory requirements. A source file of less than one hundred bytes of graphics commands can result in converted raster image data of as much as one million bytes. Sending the raster image data from the host to the printer also takes a much greater amount of time than sending the graphics commands.

It is the general aim of the present invention to provide a page printer capable of mixing text data and image data, represented by graphic commands, on a page to be printed, without the foregoing disadvantages.

SUMMARY OF THE INVENTION

In accordance with one aspect of the invention, a printer is provided which receives and stores coded text character data and also receives graphic image commands in the same datastream. The printer creates a raster image of the graphic image commands and stores the resultant raster image. When rasterizing a page, the printer rasterizes the text character data utilizing stored raster fonts and rasterizes the graphic image data from the created and stored raster image.

In carrying out the invention, if the page printer has a full page bit map available for rasterization, the graphic image commands can be interpreted and the resultant raster data written directly to the bit map together with rasterized text characters. This would preferably be done in a printer having sufficient memory to support two full page bit maps, one being used for rasterization while the other is being serialized to the print engine. In this way the interpretation of the graphic image commands would not detract from the performance of the printer. If single full page, or less than full page, rasterization is employed, it would be preferable to interpret the graphic image commands to form a separate raster image prior to rasterization.

In accordance with another aspect of the invention, a special "text" character command structure is used for permitting the mixing of graphic image commands with text data and commands. This command provides parameters for defining a "window" for the rasterized graphic image data on the page, and the printer uses this window for "clipping" the graphic image defined by the graphic commands.

The command and the printer also provide for automatically scaling the image produced by the graphic image commands into a defined window and for reducing the resolution of the rasterized image, if necessary, to accommodate the amount of memory available for storing the image.

Further advantages of the invention will become apparent upon reading the following detailed description and upon reference to the drawings, in which:

BRIEF DESCRIPTION OF THE FIGURES

FIG. 6 is an illustration of the structure of a portion of an exemplary IPC command;

DETAILED DESCRIPTION

Figure 1:
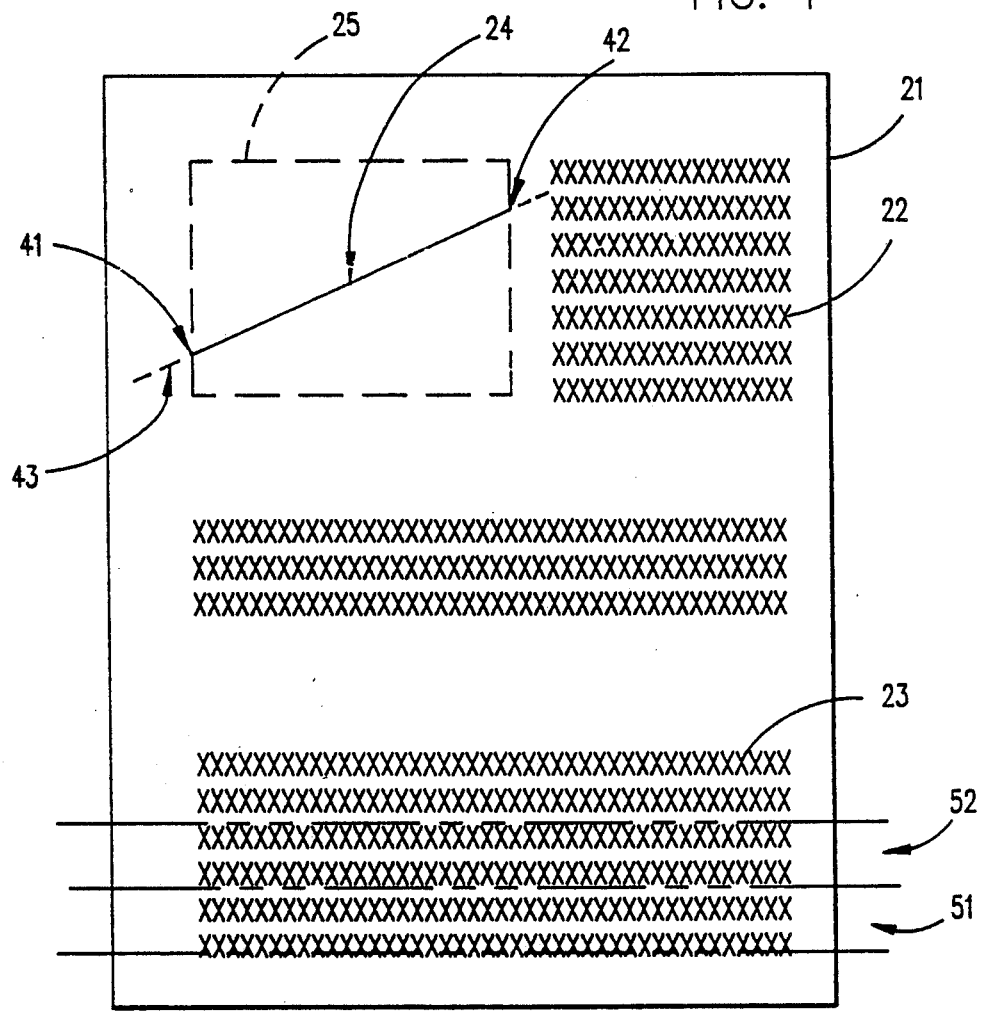
FIG. 1 shows an illustrative rasterized and printed page combining text and plotter graphics.

While the invention is susceptible to various modifications and alternative forms, a specific embodiment thereof has been shown by way of example in the drawings and will herein be described in detail. It should be understood that it is not intended to limit the invention to the particular form disclosed, but the intention is to cover all modifications and alternatives falling within the spirit and scope of the invention, as defined by the appended claims.

With reference to FIG. 1, a printed page 21 includes text portions 22, 23 and a graphic image (in this case a line) 24 lying within a window 25 (which is not actually printed) on the page. The information for the printed page appears in this form in the rasterized bit map memory of a page printer, either in whole in a full page bit map memory or by notionally combining the rasterized swaths of a partial page bit map. In a swathing architecture, all of the bit map swaths representing the page 21 would, of course, not exist at the same time in the bit map memory.

In accordance with an aspect of the invention, the plotter commands to place the line 24 on the page 21, and in the appropriate location in the bit map memory, are received by the printer intermingled with the text data such as 22 and 23; and the plotter commands are interpreted and rasterized within the text environment.

Existing serial printers such as the IBM Proprinter respond to a datastream typically designated an ASCII datastream, or extended ASCII datastream. The foundation for the datastream is a group of character codes, and the datastream includes both character codes and operation codes. The character codes include designations of alphanumeric characters, special symbols and the like. The operation codes include move codes which move the print point through the page either in increments or by larger distances.

Figure 2:
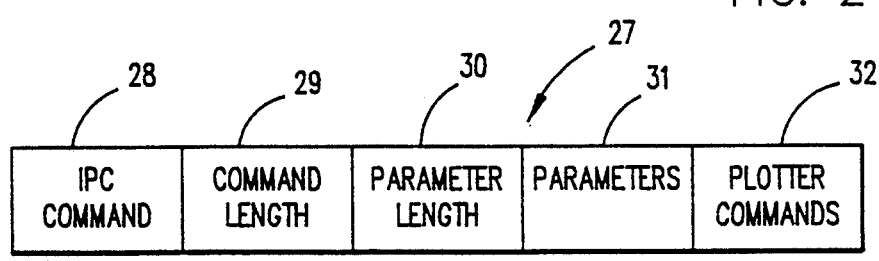
FIG. 2 is an illustration of the components of a command to include plotter commands in a text datastream.

Plotter commands are commands originally designed to direct the operation of a pen plotter, including commands to raise or lower the pen, draw line segments, draw geometric shapes, etc. In order for a host computer to send plotter commands to a page printer, such as that described herein, within an ASCII or extended ASCII (hereinafter, "text") datastream, an "include plotter" command (IPC) is used. As shown in FIG. 2, an IPC command 27 is structured to include a command identifier 28, parameter-related portions 29, 30 and 31, and the plotter commands themselves, 32.

When the printer, in parsing commands from the host, recognizes the identifying portion 28 of the IPC command, it processes the command to produce a large "font" in memory in which the resultant graphics image for the plotter commands is placed. Subsequently, the raster data which has been stored in the large font is transferred to the bit map memory during rasterization.

In the command 27, a command length portion 29 identifies the length of the command including the portions 30, 31 and 32. This permits a serial printer, for example, which is incapable of responding to the IPC command to skip to the next text character or command. A portion 30 of the IPC command sets forth the length of the parameter portion 31 of the command. In practice, the parameter length portion 30 is a byte value which identifies the number of bytes of data in the parameter portion 31. A value of zero in the parameter length portion indicates the absence of a parameter list, and in this case all previous values of the parameters are used and the plotter commands 32 immediately follow the field 30.

In the particular form of the command utilized in the present printer, the command identifying portion 28 comprises the ASCII characters for "escape", left bracket, and lowercase "m". The command length portion 29 is two bytes in size.

The parameter field 31 of the IPC command 27 includes a first parameter which establishes various conditions for the execution of the plotter commands, usually followed by parameters for defining a rectangular window location on the page in which the plotter graphics will be located. The first parameter is one byte in length and will be described in more detail subsequently. This first parameter is followed by four parameters defining the X,Y coordinates on the page for the upper left and lower right corners of the graphics window. Each of the coordinates are two bytes in length.

Figure 3:
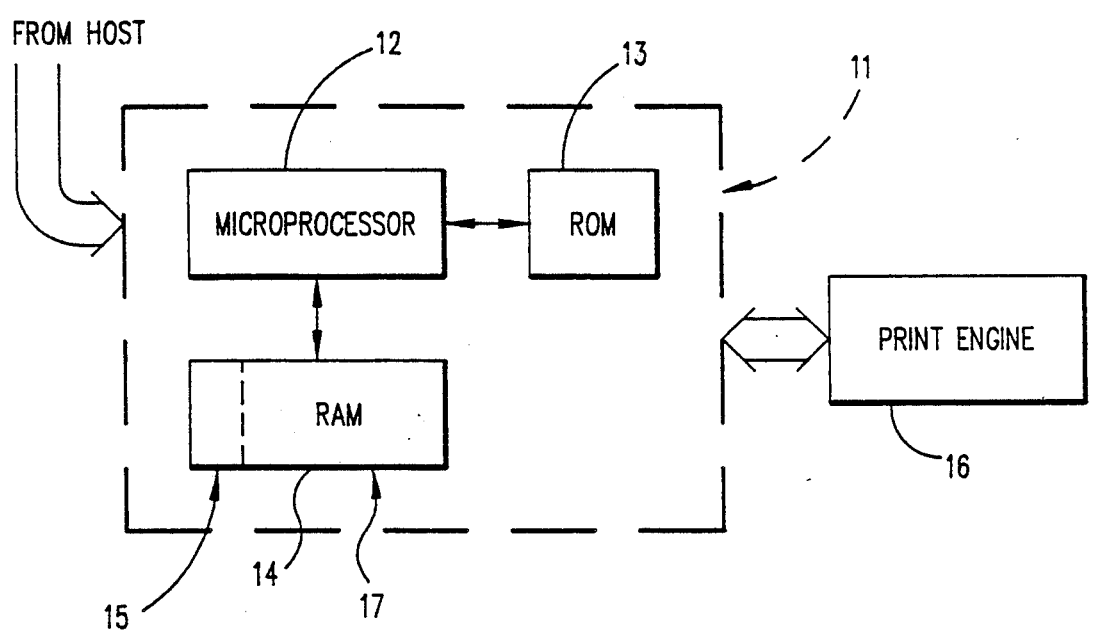
FIG. 3 is a block diagram of a printer in accordance with the present invention.

Referring now to FIG. 3, a laser page printer operable in accordance with the present invention includes a printer controller 11 containing a microprocessor 12 and associated read-only memory (ROM) 13 and random access memory (RAM) 14. In the present printer, the microprocessor 12 is a Motorola 68000 microprocessor. The ROM 13 contains the instructions executed by the microprocessor 12 to cooperate with the balance of the controller 11 to control the print engine 16 of the page printer in response to commands and data received from a host computer. The print engine 16 is the non-controller portion of the page printer, including, in the present instance, a laser printhead driven by the controller 11, a photoconductor, developer material, a drive motor, and so on.

The RAM 14 in the controller 11 contains system memory 15, as well as user memory, a page buffer, and bit map memory, all of which are collectively designated 17 in the figure. The RAM 14, in the exemplary printer described herein is 512 kilobytes, and the system memory 15 is a portion of the available memory which is utilized by the microprocessor 12 for system pointers, buffers and other storage.

The page printer controller 11 produces an image (called a bit map) of a page in the RAM memory portion 17 into which the data to be printed is rasterized and out of which the bits to be printed are serialized. The RAM portion 17 also includes a page buffer portion for storing the text character representations and text commands. Data is also contained in the page buffer for pointing to rasterized graphic images in user memory so that the graphic images can be rasterized with the text data (using text character fonts) from the page buffer into the bit map memory. Text fonts may be contained in user memory in the RAM 14 or in ROM, which for present purposes can be regarded as part of the ROM 13.

In general, the graphic images may be regarded as being stored in a raster buffer. In practice, in the particular printer described herein, the graphic images are stored as plotter "fonts" in the user memory. This permits the graphic images to be accessed and handled using techniques employed for raster fonts.

Figure 4:
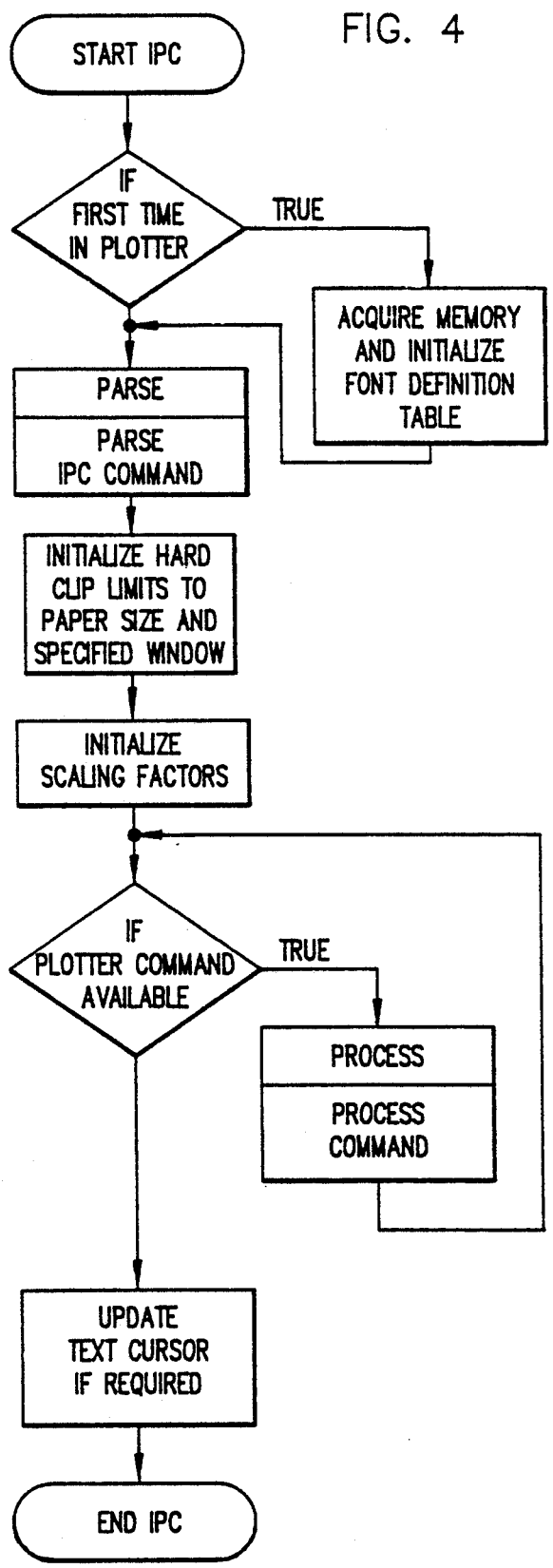
FIG. 4 is a flowchart of the operation of the microprocessor of FIG. 3 in receiving and processing an "include plotter" command (IPC)
Figure 7:
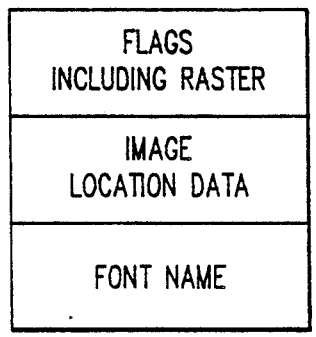
FIG. 7 is a diagrammatic illustration of a font definition table.

The general sequence for the microprocessor 12, operating under program control, to process an IPC command is shown in FIG. 4. Once the command identifier is recognized, the microprocessor first determines if this is the first time since, for example, a reset or datastream mode change, that a plotter command has been received. If so, the processor acquires sufficient memory for a plotter font definition table and initializes the table in user memory. This font identification table is similar to tables for, for example, fonts downloaded from the host to the user memory of the printer. The plotter font definition table contains pointers to the locations of the font "characters". When initialized, these pointers are set to zero in the table. If subsequently only one raster image derived from graphic commands is produced, there will only be one non-zero value in the font definition table. A diagrammatic illustration of the font definition table is shown in FIG. 7. There is a font definition table for each font available to the printer controller for rasterizing characters into the bit map memory. In the present printer, text character fonts are usually maintained in a columnar format, although some larger character images are maintained in the form of raster lines and designated raster fonts. The plotter images created by the execution of plotter commands are also maintained as raster fonts.

In the font definition table as shown in FIG. 7, the table includes certain flags, including a flag indicating that the font is a raster font if that is the case. Therefore, plotter fonts as well as other raster fonts are identifiable by the flag in the font definition table. The font definition table also contains data pointing to the image location for each of the raster fonts. A font definition table in the present printer can point to as many as 256 font images. The font definition table also has a field containing the font name. For the plotter font definition table, there is a name identifier to distinguish it from other raster font definition tables.

Using an existing font definition table, or having produced one if necessary, the processor then parses (FIG. 4) the IPC command. This process shall be described in more detail subsequently, but in substance parsing the IPC command calls for analyzing the parameters contained in the command to locate the plotted image on the page and to set the various image attributes.

In the IPC command parameters, a user window, relative to the page, is defined. The location of this graphics window can be, for example, anywhere within the text page. It is located in accordance with the IPC command parameters with respect to the normal text coordinate system for the page.

The window is a rectangle defined by its top left corner and bottom right corner, in an orientation and coordinate system in which the X direction is across the top of a portrait page (with zero being the top left paper corner) and the Y direction is down the left side of the portrait page. This window represents, in plotter terms, the hard clip limits for any graphic drawing order commands that are embedded in the IPC command. That is, if any of the drawing orders attempt to "draw" outside this window, the image is "clipped" such that a virtual cursor position is maintained but no printing will result outside that area.

In the flowchart of FIG. 4, after the processor parses the IPC command, the hard clip limits for the window are set to the area formed by the intersection of the paper boundaries and the specified window. Typically the window falls within the page, as is the case for the window 25 and the page 21 of FIG. 1, and the hard clip limits are the window 25. If no window is defined by IPC command parameters, the hard clip limits are substantially equal to the paper boundaries.

The processor next initializes scaling factors so that, if the processor is scaling plotter command distances (such as the length of the line 24 in FIG. 1) the scaling factor is stored for each orthogonal direction of the plot.

The processor then processes each of the plotter commands contained in the plotter command portion 32 (FIG. 2) of the IPC command. This process shall be described in more detail subsequently, but substantially the plotter commands are executed to place lines into the window, which is assigned a memory location in the user memory. After all of the plotter commands have been executed, the text cursor is placed in the proper position and the processing of the IPC command is complete. Depending upon a parameter setting in the IPC command, the cursor for the next text command can be returned to the position it had prior to the IPC command or left at its location at the end of execution of the plotter commands.

Figure 5:
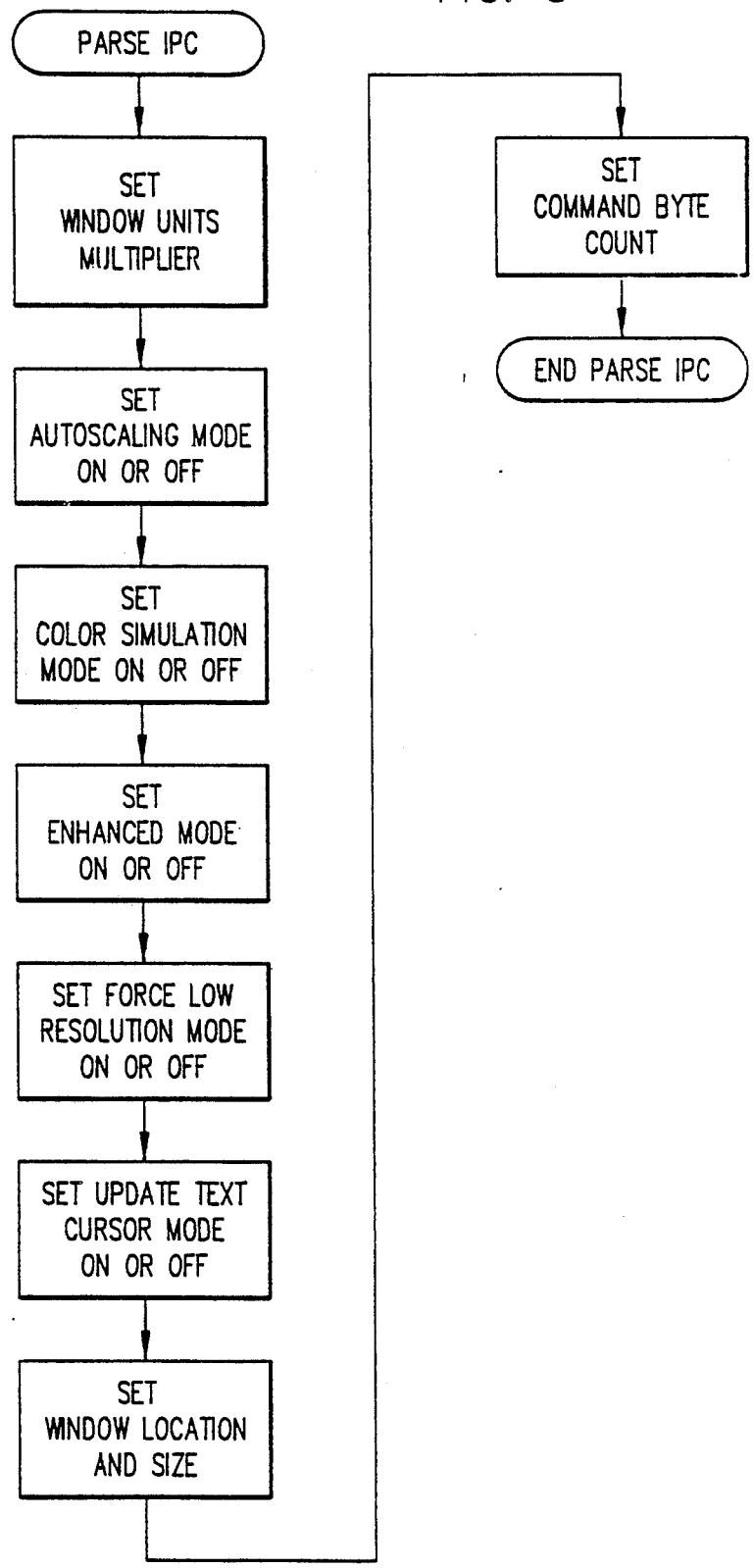
FIG. 5 is a more detailed flowchart of the command parsing step of the flowchart of FIG. 4.

With reference now to FIGS. 5 and 6, the parsing of an IPC command will be considered in more detail. In FIG. 6, the uses for the bits in the first IPC parameter, which is one byte in length, are shown. The first parameter byte includes a first (most significant) two bits which identify the units for positioning the window on the page. The units required to define the two points (upper left and lower right) of the window rectangle can be in any one of three unit systems in the present printer. One unit is 1/1016 inch (plotter units), and two alternative units are 1/1440 inch or 1/1200 inch.

The next bit determines if auto-scaling is on or off. In order to reduce the amount of conversion and preparation time in the host application, the printer controller will (when auto-scaling is selected or on by default) automatically scale the incoming graphic image to fit within the window that has been specified. The IPC command is structured to allow an application running on the host computer to only know the size in bytes of a previously generated plotter source command file. In this way the preface IPC command byte can be added by the application software to the beginning of the plotter data to be sent directly to the printer. The host application need not know how large the resultant plot would be on the paper, since the auto-scaling feature scales the plot to fit within the specified user window on the page.

The next bit in the first parameter byte is to set color simulation. In this mode the plotted lines can take different dot and dash forms for different colors. The next bit sets enhanced mode (which changes the quality of downloaded plotter characters) on or off. The next bit can force low resolution mode. In low resolution mode, every other bit of the image produced in the window is stored in the horizontal and vertical directions to reduce the amount of user memory necessary to hold the plotted image. This mode is selected, whether or not designated, by the printer controller if there is insufficient user memory for a full resolution image to be stored, but sufficient memory for storing the plotted image in low resolution. The stored bits of a low resolution plotter image are doubled in the horizontal and vertical directions at rasterization to restore the size of the image. The next-to-last bit in the first parameter byte selects whether the cursor is to be restored to the previous text position or left at the last pen position as set by the plotter commands.

If the first parameter byte has all bits, including the last bit, set to zero, the previous values for the above-described parameters are used. If the first parameter byte is set to one (all bits zero but the least significant bit), the parameters are set to the power-on reset default values. These default values are noted in the figure.

As shown in FIG. 5, in parsing an IPC command, the processor, in the first six steps of FIG. 5, sets flags for the six parameter values contained in the first parameter byte (FIG. 6). The processor then sets the window location and size based upon the next four parameters, which establish the X and Y coordinates of the upper left and lower right corners of the window, utilizing the units set in the first step. The processor next sets the plotter command byte count, which is the difference between the command length 29 value (FIG. 2) and the parameter length 30 value (including the size of the field 30 itself). In processing plotter commands, the processor will utilize this number of bytes and then return to parsing text characters and commands. After setting the command byte count, the processor has completed parsing the IPC command.

Figure 8:
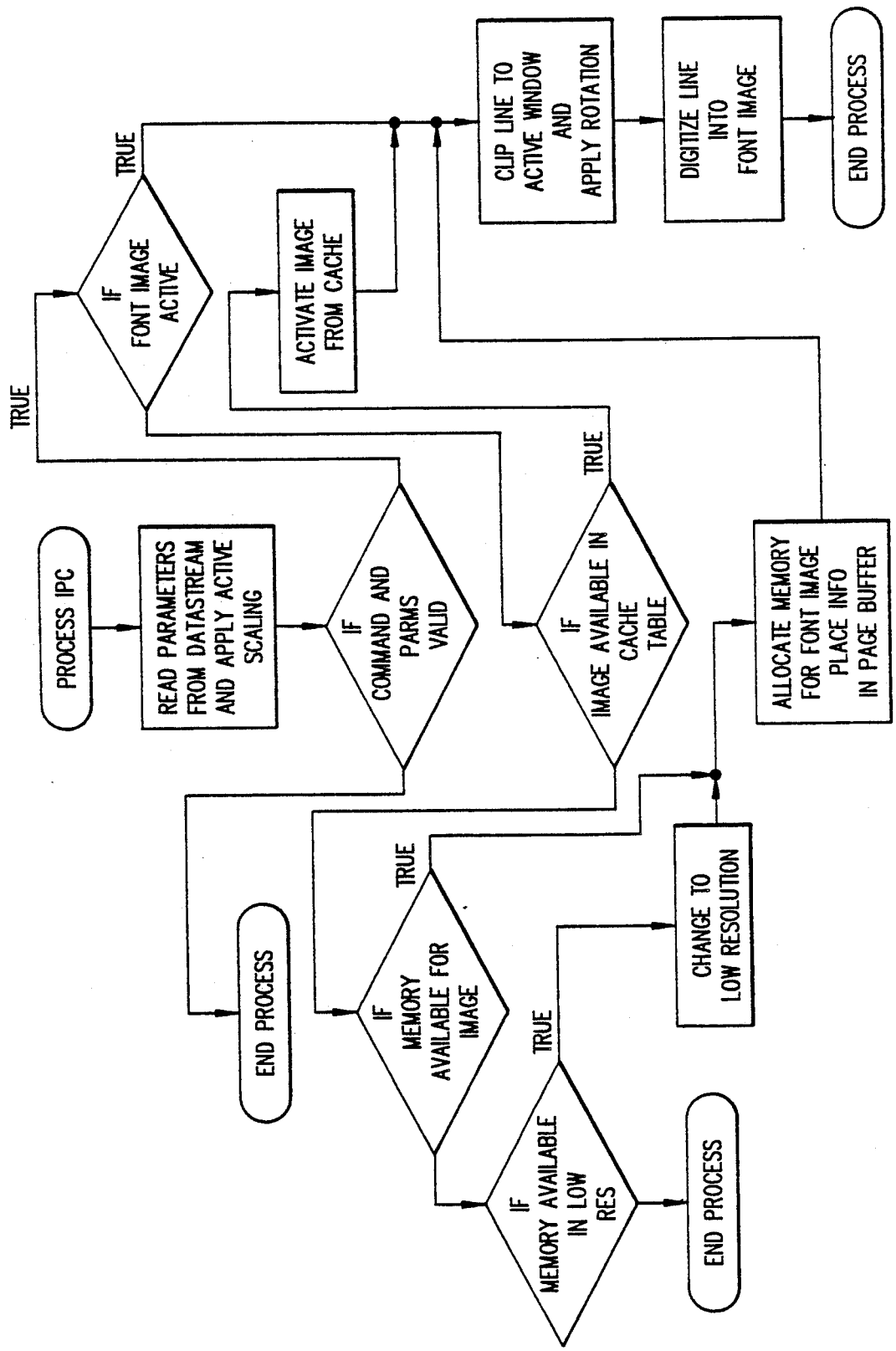
FIG. 8 is a more detailed flowchart of the processing step of the flowchart of FIG. 4.

The procedure for processing each plotter command within an IPC command is shown in the flowchart of FIG. 8. This is the procedure followed for adding to a raster font image on the basis of a plotter command from the plotter command portion of the IPC command. To do this, the processor first applies the requisite scaling to the distance values in the command. The scaling is known from the appropriate parameter setting in the first parameter of the IPC command.

The plotter command being processed in the flowchart of FIG. 8 might be to draw a line from the point 41 to the point 42 (FIG. 1). If this command and its associated parameters are valid, the processor determines if a font image is active into which to draw the line. If the command and parameters are not valid, the command is not processed, and the processor proceeds to the next plotter command.

A font image is active if the user memory needed for the raster data for the window has been set aside for a previous plotter command. Typically, this is true, and the processor then proceeds to clip the line data to the active window. Any part of the line, such as the part 43 of the line 24 (FIG. 1) falling outside the window boundaries is not written.

When an IPC command is used to introduce plotter commands to the printer, the orientation of the plotter window coincides with the orientation of the text page. The plotter data in the window can be rotated relative to this orientation. Therefore, when the processor clips a line to the active window, rotation is applied, if called for by the plotter command. The processor then digitizes the clipped and rotated line into the font image. This ends the processing for one plotter command.

Figure 9:
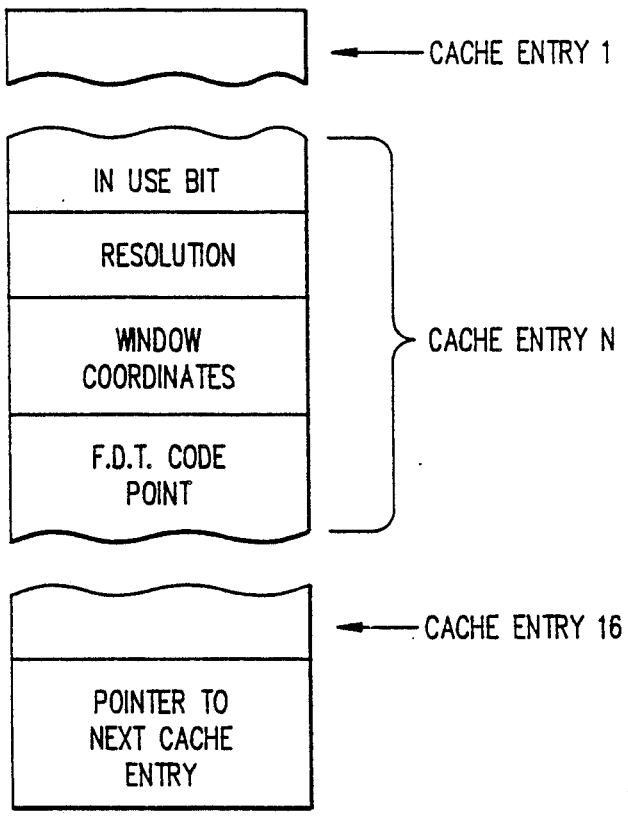
FIG. 9 is a diagrammatic illustration of a font cache table.

If at the "if font image active" decision point, there is no font image active, the processor checks to see if an image is available for use by looking images in use in a cache table. An exemplary cache table is shown diagrammatically in FIG. 9. For each window of image data stored in user memory, an entry is made in the cache table to show the boundaries of the image window, its resolution, and the like. The processor can then determine if the image area now needed matches, or fits within, an already existing image window. If an image is available in the cache table, the processor uses pointer values to the appropriate font definition table code point to find the window. The processor then activates the image thus identified in the cache table. The processor next proceeds to clip and digitize into the now active image area.

If a suitable image is not available in the cache table, then the processor will attempt to create a suitable image area in user memory. If there is memory available for a new image area, the processor allocates memory for the image from the user memory, activating the image area, and places appropriate pointer information (as shall be described subsequently) in the page buffer. Therefore, when the contents of the page buffer are rasterized, the processor can access the image data from this image area. The processor also at this time places the appropriate entries in the cache table. The processor then clips and digitizes the line as before.

If memory is not available for the requisite image area, the processor determines if there is sufficient memory to store the data in low resolution mode. If so, the processor selects low resolution mode for digitizing the commands and proceeds to allocate the memory as discussed earlier. If there is insufficient memory for even low resolution storage in an image area, the microprocessor is unable to process the plotter command and proceeds to the next plotter command. The processor does not simply disregard the balance of the plotter commands in an IPC command in this instance since some plotter commands reduce the requisite window size, permitting subsequent plotter commands to be processed.

To summarize, in the described printer, plotter commands are received embedded within a text command, known as an IPC command. The microprocessor in the controller of the printer parses the IPC command to establish certain environmental information for the plot produced by the plotter commands. The plotter commands are then processed into a raster image as defined by the plotter commands. This raster image is stored in user memory in the printer RAM in the form of a large font image.

In the page buffer in the printer RAM, the processor stores a pointer and other information concerning the plotter "font" together with conventional text characters and movement commands. When the page is rasterized, and the text characters placed in the bit map memory in accordance with stored font data, the plotter "font" is also written into the bit map memory. This merges the plotter and text data in the bit map without requiring processing of plotter commands by the host computer and without requiring processing of the plotter commands at the time of rasterization. The composite bit map containing text and plotter images is then serialized to the print engine to produce the printed output.

In an exemplary form of printer, to now be described, the page buffer is organized in the form of packets of text, packets of image data and packets of raster font information. The exemplary printer is a partial page bit map printer employing swathing for rasterization. The practice of the invention is not limited to particular page buffer or bit map memory architectures, but the description of further aspects of the invention will be in conjunction with the present printer for exemplary purposes. Particularly, the technique for the deletion of plotter image areas in user memory no longer needed for rasterization shall be described in association with the exemplary printer.

Returning to FIG. 1, the page 21 is arranged in the form in which it is presented to the print engine during serialization and in which it is subsequently reproduced on paper. The page 21 is not present in bit map memory in its entirety but is represented sequentially in a series of swaths, such as 51, 52, in the bit map memory proceeding from the top of the page to the bottom. In the illustrated page 21, while a swath 51 is being rasterized, the swath 52 is being serialized to the print engine, while swaths below the swath 51 have not yet been rasterized.

In the exemplary page 21, the page contents include text areas 22 and 23 and the window 25 of plotter graphics, including the line 24. Each of these areas of the page is stored in a page buffer in the order in which that area of the page was received by the printer as separate "packets" of data in the page buffer. In the case of text data, a packet is terminated (and a new packet begun) if there is a change in the character font, if the character mode (such as bold or double wide) changes, or if there is any upward movement of the location of characters on the page.

Image data is also packetized. The image data is organized into a raster scan format before being placed into a packet. A packet of image data is terminated if there is a change in the resolution of the image data or upward movement on the page. In the case of raster fonts, of which plotter images are a subset, each image is a separate packet. The page buffer entry for the packet does not include the raster image data but instead pointer information to the "large font" in the user memory.

In the exemplary page 21, the text area 22 is organized as a packet in the page buffer, and, assuming for example that the text data 23 is in a different font, the text 23 is in a second packet. The data for the window 25, including the line 24, is pointed to by a packet, as will be described subsequently.

Therefore, the input data for the page 21 to be printed is stored in the form of packets, without indexing, where the data within each packet is in printing order but the packets themselves are in the order received from the host, which typically is not in the printing order.

Figure 10:
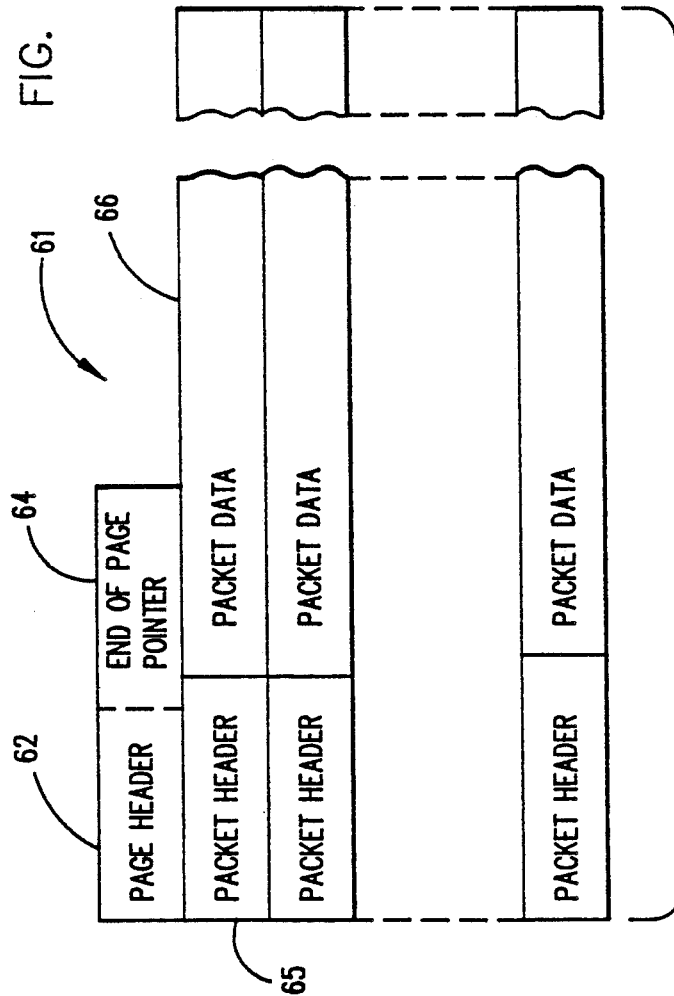
FIG. 10 is an illustration of the form of packets in the page buffer in the RAM of FIG. 3.

With additional reference to FIG. 10, a page 61 stored in the page buffer includes a page header 62 and a number of packets such as 63. Pages 61 are stored one after another in the page buffer, and packets such as 63 are stored one after another within each page. The page header 62 includes an end-of-page pointer 64, which indicates the starting point in the page buffer for a subsequent page if there is one. Each packet such as 63 includes a packet header 65 and usually includes packet data 66. The packet data is the information stored in the page buffer utilized in rasterizing the bit map swaths. The packet header contains certain identifying information concerning the contents and status of the packet. The packet header size may vary for different packet types. The header length for each packet type is a stored value. The packet data length is stored in the packet header, as shall be described subsequently.

Further details concerning rasterization and page buffer structure for the present printer, particularly with regard to text data, is described in a co-pending U.S. patent application entitled "PRINTER BUFFER AND RASTERIZATION ARRANGEMENT", filed Aug. 28, 1989, and commonly assigned herewith. In general, a text packet includes a packet header and packet data in the form of character and move codes. An image packet includes a packet header with identifying information and packet data in the form of bytes of all-points-addressable data. A packet for plotter data, such as for the contents of the window 25 in the page 21 (FIG. 1), contains a packet header with identifying information but no packet data. The identifying information directs the processor to the font data stored in user memory for use during rasterization. This type of packet is also used to represent other raster fonts such as large alphanumeric characters which are stored in user memory.

Figure 11:
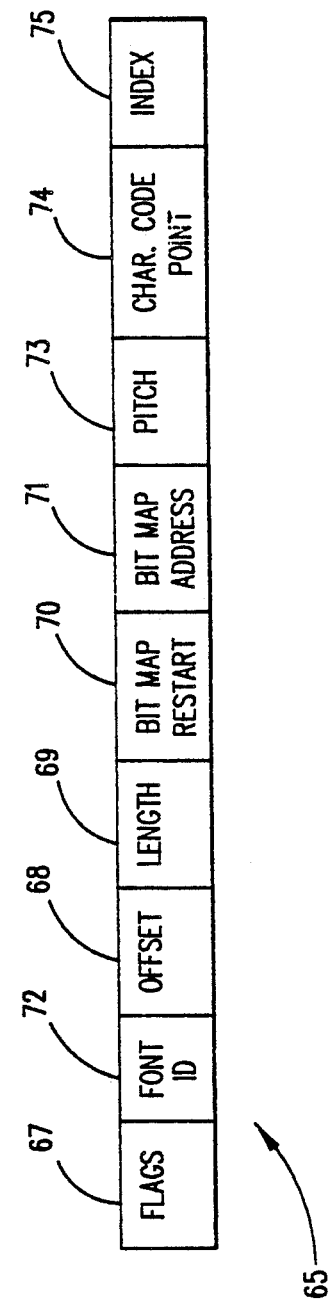
FIG. 11 is an illustration of the portions of an image packet header.

Turning now to FIG. 11, an exemplary packet header 65 for a raster font packet includes flags 67, a packet offset value 68, a packet length value 69, a bit map restart address 70 and a bit map starting address 71.

The flags 67 in the packet header include flags for indicating the packet type (raster font packet), an end-of-page flag, an end-of-page buffer flag, and flags for rasterization attributes of half high, double wide, and double high. The length field 69 is set to zero, since there is no packet data in the packet. The offset field 68 is initialized to the height of the raster font character in raster lines. As indicated earlier, the stored graphics information for a graphic window is stored as a raster font character, and the height of the character in raster lines is substantially equivalent to the height of the window in raster lines.

The bit map address 71 is the logical address in the bit map of the page for the placement of the first data to be rasterized from the packet. The bit map restart address 70 is the address for the next data to be rasterized into the bit map.

The font identification field contains a byte which identifies the plotter font definition table and permits the processor to find that table. Other (non-plotter) raster fonts would contain other font identification field data.

The pitch field 73 has two bytes which contain the width of the character (in this case the plotter window). The character code point field identifies the character in the font definition table. The index field 75 is initialized at zero and is used to hold the actual pointer to the character image data.

Figure 12:
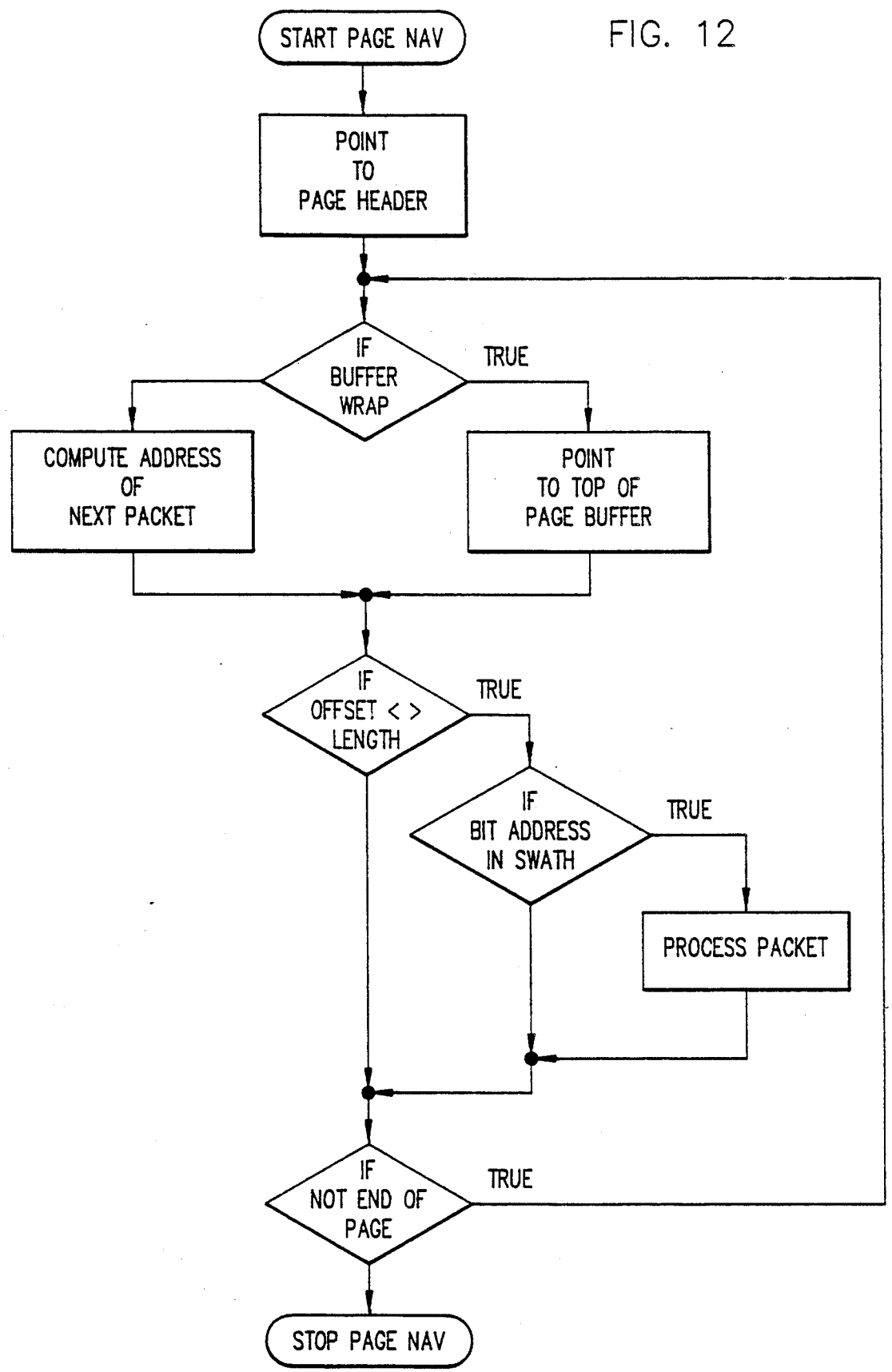
FIG. 12 is a flowchart of the operation of the microprocessor in the printer of FIG. 3 to rasterize a swath of the bit map memory.

As the printer controller rasterizes each page from the page buffer, it moves down the page from swath to swath. For each swath which is processed, the microprocessor visits each packet of data for the page to determine if there is a contribution from that packet to the swath. This operation is shown in the flowchart of FIG. 12. In navigating through the packets of a page to rasterize a swath, the processor first examines the page header.

In the present printer, the page buffer data, on an inter-packet basis, can "wrap" from the bottom of the page buffer memory to the top. Therefore, the processor examines the page header to determine if a flag is set indicating that the balance of the page packets have wrapped to the beginning of the page buffer. If so, the processor moves to the top of the page buffer. If not, the processor moves to the address of the next packet. This address is determined from header information concerning the type of packet (the page header is a special type of packet), which determines the length of the header, combined with the length of the data portion of the packet (which in the case of a page header is zero).

The processor then determines what the offset value is in the packet addressed and if this offset is not equal to the length of the packet.

If the offset is equal to the length, this corresponds to the status of the packet for the text 22 (FIG. 1) while the swath 51 is being rasterized. If the offset is not equal to the packet data length value, the processor next determines if the restart bit map address is in the swath being rasterized. The bit address of interest will either lie within the swath being rasterized or below it. If the restart address is not in the active swath, the packet is not processed. If the bit address is in the swath being rasterized, the packet is processed to place the appropriate data in the packet into the swath, as will be described in conjunction with the flowchart of FIG. 13, which deals with the rasterization of a raster font packet.

In practice, a raster font packet contains a length of zero and an offset initialized to the height of the character in raster lines. As a portion of raster font data is rasterized into a bit map swath, the offset value is reduced to a value corresponding to the number of raster lines left to be rasterized for that font character (or plotter window in the case of a plotter image). In a text packet, on the other hand, the offset is initialized to zero and incremented as text data is rasterized until the offset value increases to equal the length value.

After rasterization of some or all of a packet, or in the case that there is no data to be rasterized from the packet, the processor then determines if it has reached the last packet in the page. If not, the processor loops to check for buffer wrap and proceeds through the above-described sequence of steps. If the processor is at the end of the page, the rasterization of that swath has been completed.

To summarize, in storing input data in the page buffer, the printer microprocessor accepts data received in an orderly fashion as part of a single packet of data. These packets of page buffer data are stored in the order received and are not linked or indexed in any fashion. Then, at the time of rasterization, the processor examines each packet for each swath that is rasterized. Packets that have been fully rasterized already, and those which start below the active swath being rasterized, are disregarded; and the processor rasterizes the relevant parts of the other packets into the swath.

Figure 13:
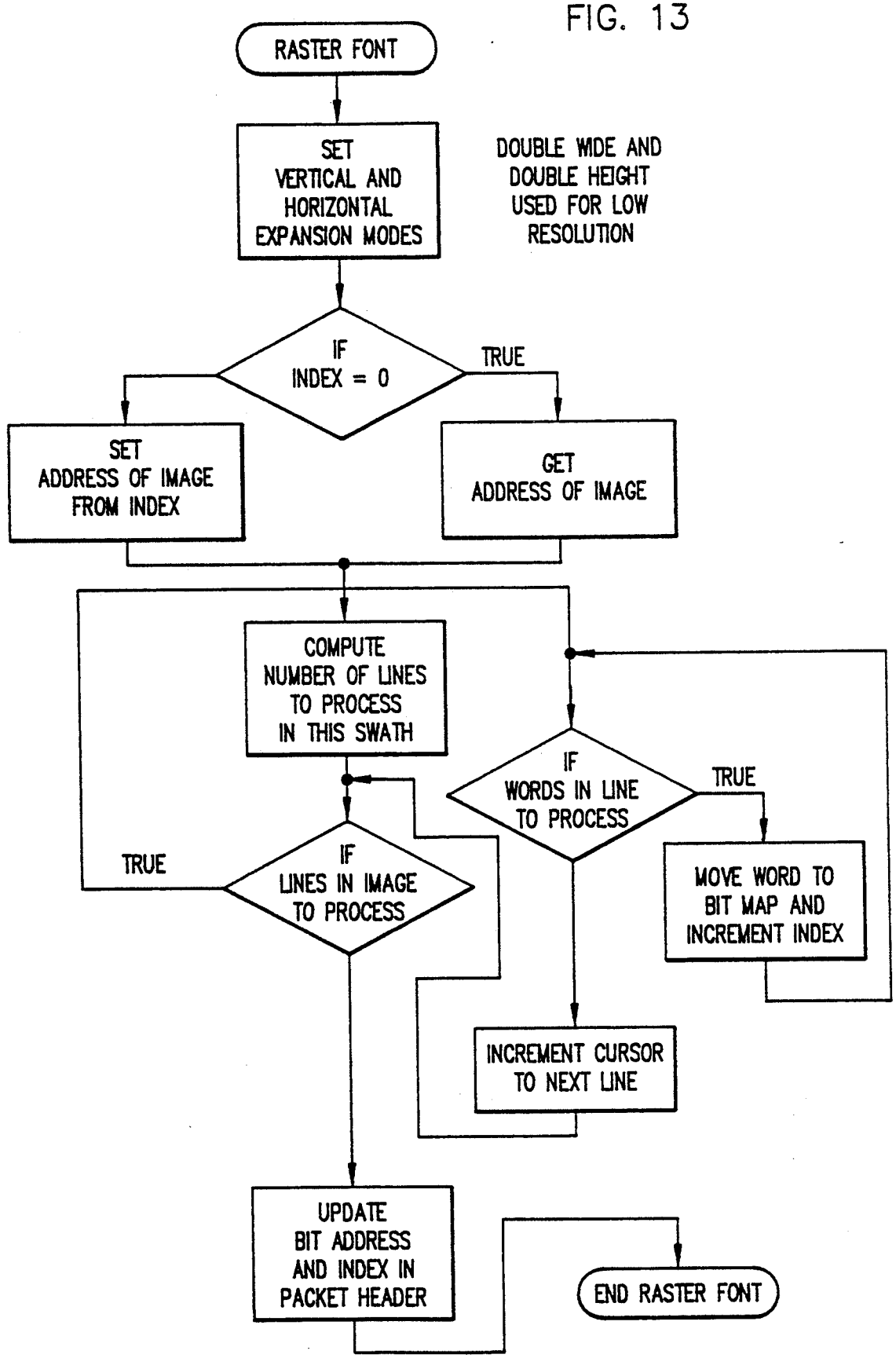
FIG. 13 is a flowchart of the operation of the microprocessor in the printer of FIG. 3 to rasterize a raster font into a swath of the bit map memory.

Referring now to FIG. 13, in order to rasterize the data for a raster font packet, the microprocessor first sets the vertical and horizontal expansion modes, based upon the setting of the double wide and double high flags in the packet header. When low resolution has been called for in processing an IPC command, these bits will be set for double wide and double high.

The processor next determines if the index value (in the field 75 of FIG. 11), is equal to zero. If so, the address of the image is obtained using the font identification field value and the character code point value. In the case of a non-zero index, indicating that at least part of the raster font data has been rasterized into the bit map, the processor sets the address of the image in the swath from the index value.

The processor then computes the number of lines to process for the swath and for each line to be processed rasterizes each data word from that line. As each data word is moved to the bit map, the index value is incremented. When a line is completed, the cursor is incremented to the next line. After the last line of the image lying within the swath has been processed for the swath, the processor updates the bit map restart value in the field 70 and the index value in the field 75 in the packet header. This completes the processing of the raster font for a swath.

Figure 14:
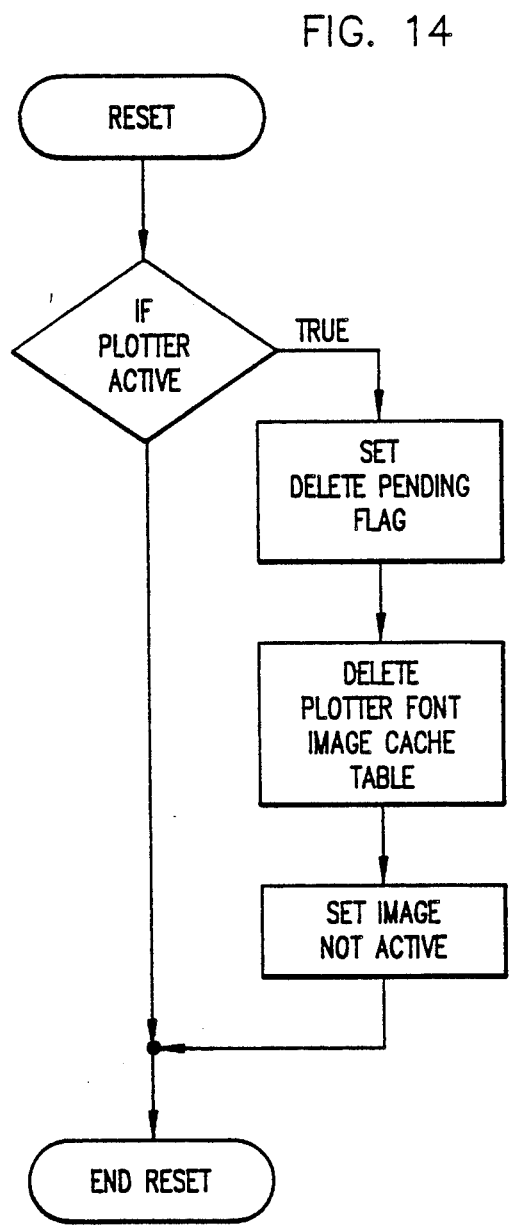
FIG. 14 is a flowchart of the operation of the microprocessor in the printer of FIG. 3 to mark plotter data for deletion from memory.

Since a relatively large amount of user memory may be required to hold a window of plotter data in the form of a raster font, procedures are provided for deleting such data when it is no longer needed for an unprinted page. This is a two step process. First, when a page is released to the print engine for printing, and all data is serialized from all of the swaths of the bit map memory, the microprocessor executes a reset routine shown in FIG. 14. In this routine, the microprocessor determines if there were any plotter images in the page that has been printed. This can be determined by checking the state of a system flag. If no plotter data was used on the just-printed page, the routine ends. If there was plotter data for the just-printed page, the processor first sets a delete pending flag in system memory, indicating that there are one or more plotter data areas in user memory which can be deleted. The processor then deletes the plotter font image cache table from user memory and sets an image not active flag, indicating that no image blocks are active on the now-current page. The processor then exits the routine.

Figure 15A:
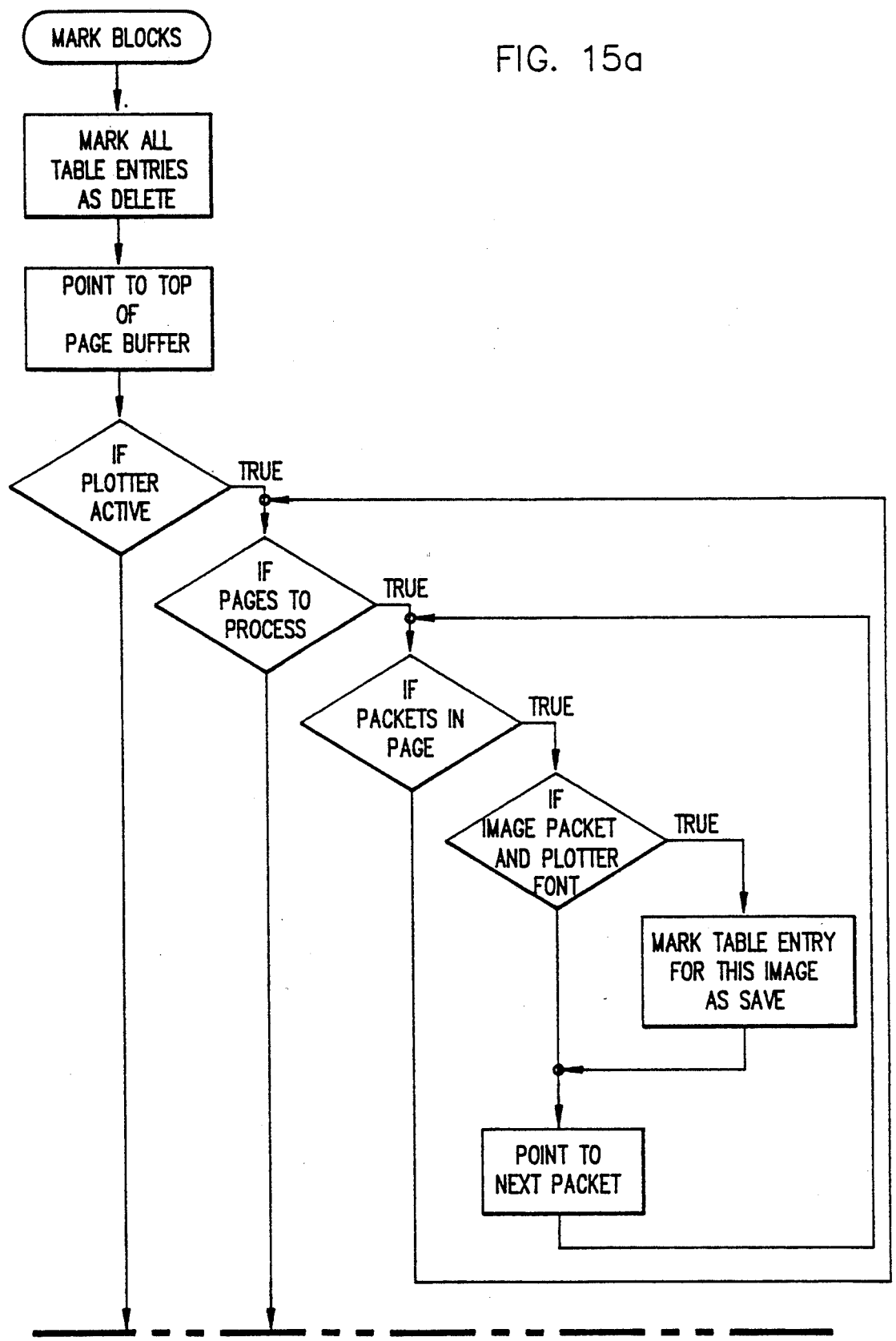
FIG. 15, formed by joining FIGS. 15a and 15b at the dashed line, is a flowchart of the operation of the microprocessor in the printer of FIG. 3 to remove plotter data from memory.
Figure 15B:
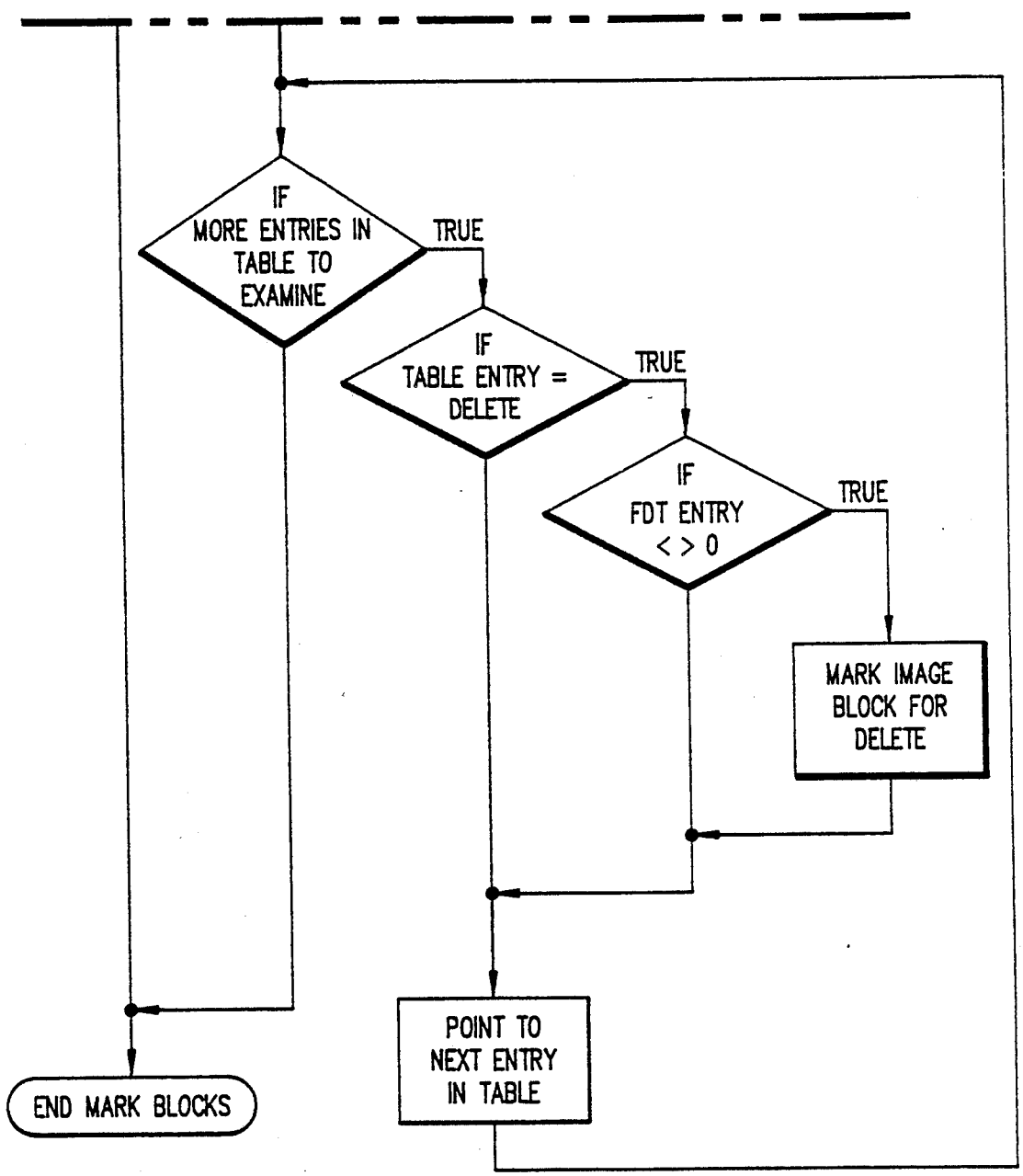

In order to actually delete plotter image data from the user memory, the blocks of image data to be deleted must be marked. To do this, when time is available from rasterization and serialization, or when there is a request for memory such as for more page buffer memory, the processor executes a "mark blocks" routine as shown in FIG. 15. In this routine, the processor first marks all of the plotter font definition table entries for deletion. The processor then points to the top of the page buffer. If there are no blocks of plotter data to be used in any unprinted page, the processor exits the routine. All of the table entries in the plotter font definition table having been marked for deletion, the plotter images in user memory will be deleted subsequently when a routine is executed to actually recover the memory used by the blocks marked for deletion.

If any unprinted page has blocks of plotter data to be rasterized, the processor examines each packet in each page in the page buffer to determine if there is a plotter font present. For each such plotter font, the delete indication in the font definition table for that plotter font is changed to a "save" indication.

After examining each packet of each page in the page buffer, the processor looks for each entry in the font definition table marked for deletion which is a non-zero value and marks the image block to which the font definition table points for deletion. These plotter data blocks are then subsequently deleted as indicated before when the processor eliminates plotter data blocks from the user memory. plotter data blocks are then subsequently deleted as indicated before when the processor eliminates plotter data blocks from the user memory.

What is claimed is:

1. A page printer, including a print mechanism responsive to serialized bit data, for printing data received by the printer, comprising:
   means for receiving and storing coded character data;
   means for receiving commands representing a graphic image;
   means for creating a raster image based upon said commands and for storing the raster image;
   means for rasterizing the stored character data and raster image data into a bit map memory; and
   means for serializing the contents of the bit map memory to the print mechanism.

2. A page printer, including a print mechanism responsive to serialized bit data, for printing data received by the printer, comprising:
   means for receiving coded character data including coded instructions;
   means for identifying a coded instruction received by the printer which includes a block of commands for producing a graphic image;
   means for executing the commands to produce and store a raster image based upon the commands;
   means for storing the coded character data;
   means for rasterizing the stored character data into a bit map memory and for rasterizing the raster image created from the commands into the bit map memory; and
   means for serializing the contents of the bit map memory to the print mechanism.

3. The page printer of claim 2 in which the commands for producing a graphic image comprise plotter commands.

4. The page printer of claim 2 in which the coded instruction includes an instruction identifying field, a parameter field, and the block of commands for producing a graphic image.

5. The page printer of claim 4 in which the parameters include parameters establishing the size of a window for the raster image.

6. The page printer of claim 5 in which the commands for producing a graphic image are plotter commands having associated position indications defining distances and in which the means for executing the commands to produce and store a raster image based upon the commands includes means for automatically scaling said distances based upon said window size.

7. The page printer of claim 2 which further comprises means for deleting the stored raster image after the contents of the bit map memory have been serialized to the print mechanism.

8. A page printer, including a print mechanism responsive to serialized bit data, for printing data received by the printer, comprising:
   means for receiving coded character data including coded instructions;
   means for storing received coded character data;
   means for identifying a coded instruction received by the printer which includes a block of commands for producing a graphic image;
   means for allocating a memory area of suitable size for storing a raster image based upon the commands;
   means for executing the commands to produce a raster image in the allocated memory area based upon the commands;
   means for rasterizing the stored character data into a bit map memory and for rasterizing the stored raster image created from the commands into a bit map memory; and
   means for serializing the contents of the bit map memory to the print mechanism.

9. The page printer of claim 8 in which the means for allocating a memory area for storing a raster image based upon the commands includes means, responsive to the unavailability of sufficient memory for storing the raster image, for allocating a reduced amount of memory for storage of the raster image in a reduced resolution, and in which the means for executing the commands to produce the raster image executes the commands to produce the raster image in a reduced resolution when said reduced amount of memory is allocated.

10. The page printer of claim 9 in which the means for rasterizing includes means for expanding a stored raster image which was produced and stored in a reduced resolution.

* * * * *